US012708589B2

(12) United States Patent
Renee Page

(10) Patent No.: US 12,708,589 B2
(45) Date of Patent: Aug. 18, 2026

(54) SEXUAL ASSAULT AID KIT

(71) Applicant: Carolyn Renee Page, Natchitoches, LA (US)

(72) Inventor: Carolyn Renee Page, Natchitoches, LA (US)

( * ) Notice: Subject to any disclaimer, the term of this patent is extended or adjusted under 35 U.S.C. 154(b) by 0 days.

(21) Appl. No.: 18/583,322

(22) Filed: Feb. 21, 2024

(65) Prior Publication Data

US 2025/0262126 A1 Aug. 21, 2025

(51) Int. Cl.
*A61J 1/12* (2006.01)
*G09B 19/00* (2006.01)

(52) U.S. Cl.
CPC .............. *A61J 1/12* (2013.01); *G09B 19/003* (2013.01)

(58) Field of Classification Search
USPC ........................................................ 206/459.5
See application file for complete search history.

(56) References Cited

U.S. PATENT DOCUMENTS 6,085,907 A * 7/2000 Hochmeister ...... A61B 10/0096 206/362.4
9,662,096 B2 * 5/2017 Kindt ..................... B65D 85/70
11,151,676 B2 * 10/2021 McIntyre ............. G06Q 10/087
11,186,418 B1 * 11/2021 Mason ............... A61B 10/0096
11,603,245 B2 * 3/2023 Mason ............... A61B 10/0096

* cited by examiner

*Primary Examiner* — Bryon P Gehman

(57) ABSTRACT

A sexual assault aid kit is disclosed. The sexual assault aid kit is a resource that collects in one place information and instructions for assisting a victim of sexual assault. In some embodiments in the sexual assault aid kit includes a victim disclosure form and associated instructions; an evidence collection receptacle and instructions for collecting evidence; a post-exposure prophylaxis disclosure and associated information; a morning after disclosure and associated information for accessing emergency contraception; a urinalysis disclosure; a crisis resource disclosure, and an instruction guide for using the other components of the sexual assault aid kit.

8 Claims, 2 Drawing Sheets

VICTIM DISCLOSURE FORM

[Introduction and Reporting Option (Restricted or Unrestricted)]

Name

Address

Age

Sex

Race

Date of Injury/Time of Injury

Assailant Name(s)

Relationship to Accused

Have You Been Threatened by the Accused or Others on His/Her Behalf?

Are You in Danger?

Did the Accused Have Visible Markings/Clothing/Physical Characteristics?

Location of Assault

Witness(es) to the Assault

Describe What Happened in Detail

Current Emotional State

Current Physical State

Fears/Concerns

Current Living Situation

Will You Likely Interact With the Assailant as Part of Normal Activities?

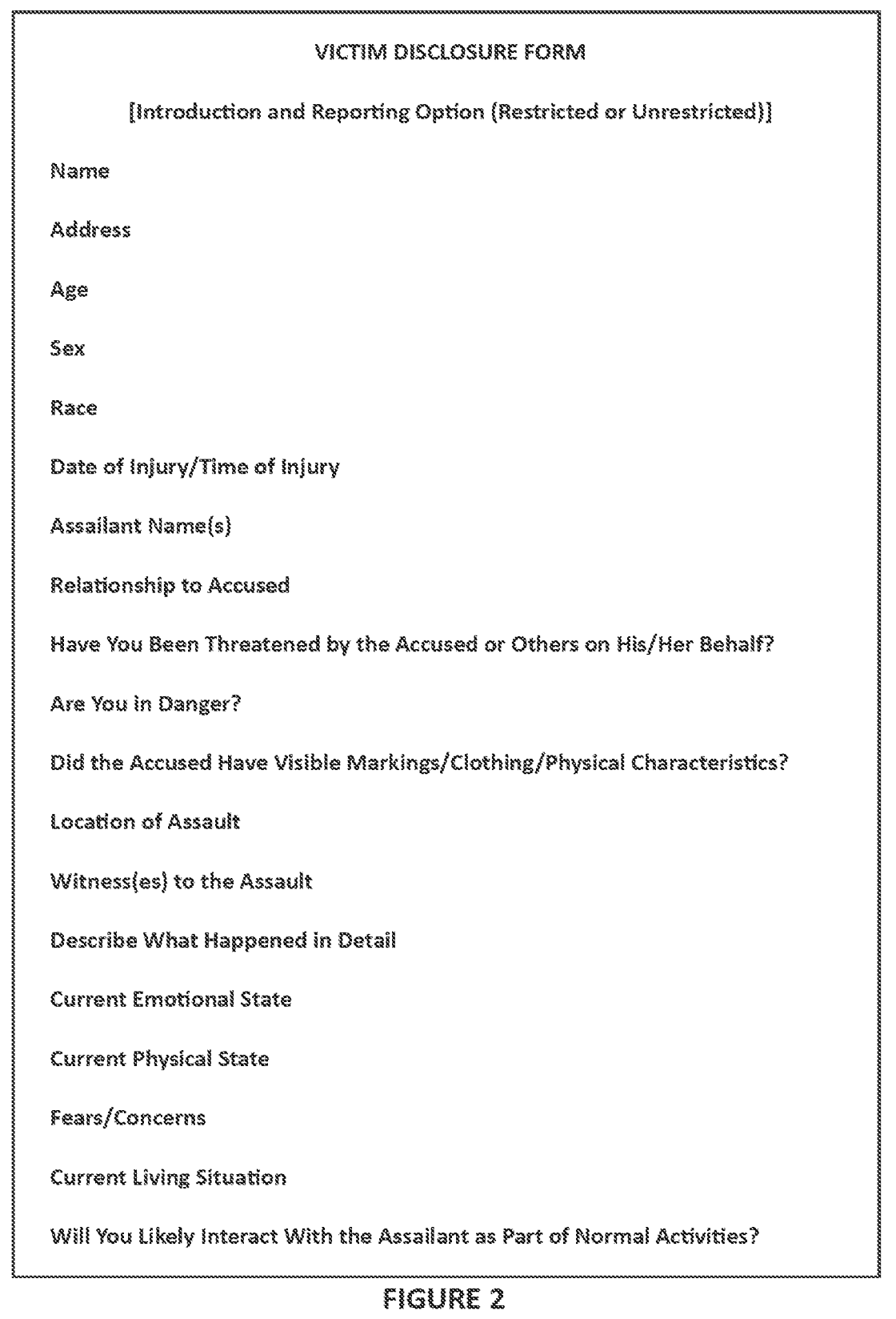

VICTIM DISCLOSURE FORM

[Introduction and Reporting Option (Restricted or Unrestricted)]

Name

Address

Age

Sex

Race

Date of Injury/Time of Injury

Assailant Name(s)

Relationship to Accused

Have You Been Threatened by the Accused or Others on His/Her Behalf?

Are You in Danger?

Did the Accused Have Visible Markings/Clothing/Physical Characteristics?

Location of Assault

Witness(es) to the Assault

Describe What Happened in Detail

Current Emotional State

Current Physical State

Fears/Concerns

Current Living Situation

Will You Likely Interact With the Assailant as Part of Normal Activities?

FIGURE 2

SEXUAL ASSAULT AID KIT

BACKGROUND OF THE INVENTION

Every 68 seconds a person in America is sexually assaulted. Dep't of Justice, Office of Justice Programs, Bureau of Justice Statistics, National Crime Victimization Survey (2020); see also RAINN (Rape, Abuse & Incest National Network) (www.rainn.org). While anyone may be a sexual assault victim, the statistics regarding assaults on women are jarring: one in six American women has been the victim of an attempted or completed rape in her lifetime, and nine out of ten rape victims are female. National Institute of Justice and Centers for Disease Control & Prevention, Prevalence, Incidence and Consequences of Violence Against Women Survey (1998).

The risk of being a victim of sexual violence is elevated for those attending colleges and universities. Among undergraduate and graduate students, 13 percent have reported being victims of rape or sexual assault. D. Cantor et al., Association of American Universities, Report on the AAU Campus Climate Survey on Sexual Assault and Sexual Misconduct (Jan. 17, 2020). Indeed, college women are twice as likely to be sexually assaulted than robbed. Dep't of Justice, Office of Justice Programs, Bureau of Justice Statistics, Rape and Sexual Victimization Among College-Aged Females (2014). But only 20% of student victims reported the incident to law enforcement. Id. One reason given for such low incidence of reporting is that the victims believed the police could not or would not do anything to help. Id.

Victims of sexual assault experience high levels of distress immediately afterward. M. Tull, Ph.D., Understanding PTSD After Sexual Assault (Updated Jul. 7, 2023) (accessed at https://www.verywellmind.com/symptoms-of-ptsd-after-a-rape-2797203). This trauma may lead to feelings of fear, anger, guilt, anxiety, sadness, and shame. Id. Further, studies show that victims are overwhelmingly likely to experience post-traumatic stress disorder (PTSD) one month after the assault, and nearly half will still show PTSD symptoms a year after. Id., citing E. Dworkin et al., Sexual Assault Victimization and Psychopathology: A Review and Meta-Analysis, Clin. Psychol. Rev. 2017; 56:65-81. This specific form of PTSD has been called rape trauma disorder. See https://students.wustl.edu/rape-trauma-syndrome/.

Victims of sexual assault are therefore almost aways suffering from acute forms of trauma and shock after the incident. Yet at a time when such victims are most in need of immediate help, there is not always a clear path to getting it. While there are many organizations that provide helpful websites, a victim may not always have immediate access to a computer or smartphone, and even if they do the amount of information available may be overwhelming and/or confusing. For example, a web search using the search terms "sexual assault assistance" returned over 44 million hits.

A victim also has access to help lines, including the National Sexual Assault Hotline (800-656-HOPE, or 800-656-4673). Some victims, however, may not be ready to speak with someone (especially a stranger, no matter how well-intentioned) immediately after the incident. Further, a victim may find it difficult to determine the right option to call. For example, consider a victim who is a student at George Mason University in Fairfax County, Virginia. George Mason University offers a hot line number on its website (703-380-1434); Fairfax County has its own hot line number (703-360-7273); the Commonwealth of Virginia has another (800-838-8238); and then there is the National Sexual Assault Hotline. It is of course laudable that there are resources available at the university, county, state, and national levels. The issue is simply that a victim may not be willing to make such a call, and/or may find the number of choices overwhelming, especially during a time of great stress.

It is therefore an object of the present invention to provide sexual assault victims with a resource that is readily available, provides clear instructions and guidance, and eliminates as much as possible any uncertainty and guesswork.

SUMMARY OF THE INVENTION

The invention disclosed herein is a sexual assault aid kit. The kit is a collection of materials that a sexual assault victim may find helpful in the aftermath of an assault. A person would already have the kit in their possession and accessible, or be able to easily obtain one, in the unfortunate event of an assault.

The kit may include, as non-limiting examples: a victim disclosure form, that the victim may use to fill out details concerning the assault; an evidence collection bag providing instructions for collection and storage of evidence related to the assault; a post-exposure prophylaxis card providing instructions concerning accessing a prescription for antiretroviral medication if there are concerns regarding HIV exposure; a "morning after" card, providing information on the availability of emergency contraceptives preventing unwanted pregnancy; a urinalysis disclosure; and a crisis resource guide providing information concerning helpful websites and toll-free numbers.

Further benefits and advantages of the invention, along with other illustrative embodiments, are set forth in the Detailed Description of the Invention.

BRIEF DESCRIPTION OF THE FIGURES

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 2 depicts an exemplary victim disclosure form in one embodiment of the invention.

DETAILED DESCRIPTION OF THE INVENTION

Figure 1:
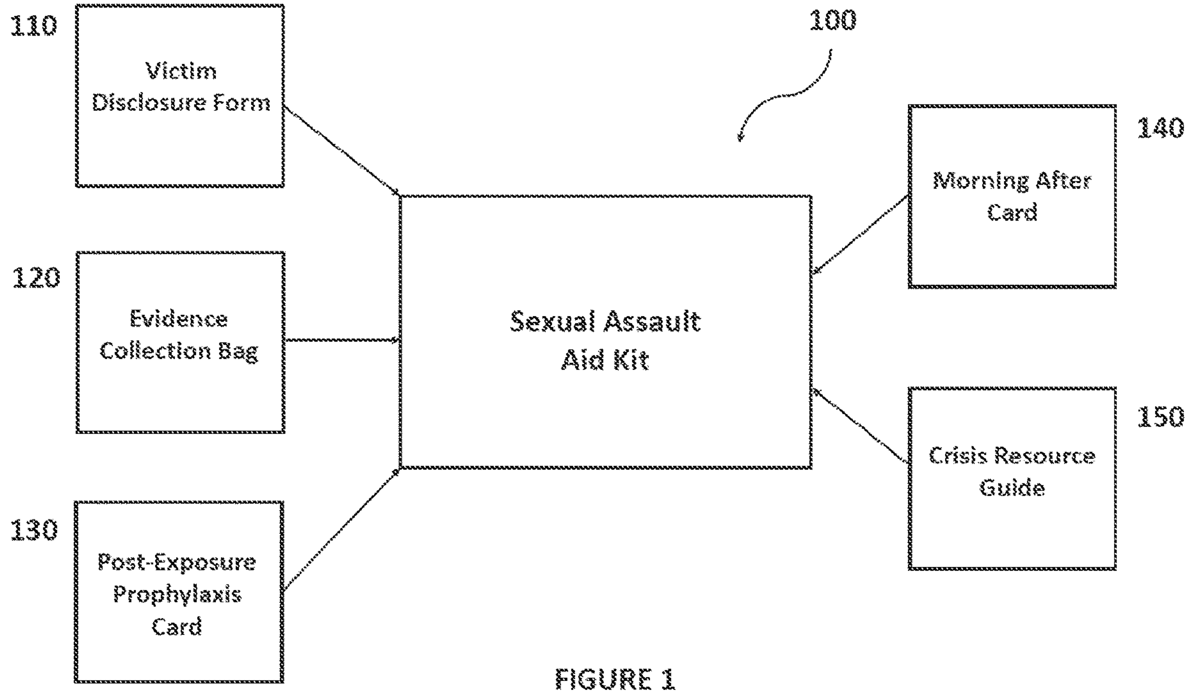
FIG. 1 depicts a block diagram showing one embodiment of the invention.

The invention is a sexual assault aid kit, providing a victim of sexual assault with materials they may want, need, or find helpful in the aftermath of an assault. The kit contains a collection of materials and resources that are intended to be accessible to a victim as soon as possible after an assault occurs. It is an intended benefit of the invention that a victim already has the kit in their possession before any assault occurs. Much like a home first aid kit, or a road assistance kit intended to be stored in an automobile in the case of breakdown or an emergency, the sexual assault aid kit is easily available when a person most needs it and contains a collection of materials that will be immediately useful and/or helpful to the victim.

In a preferred embodiment of the invention, the sexual assault aid kit is purchased or otherwise obtained and stored in a location that is easily remembered by the owner such as in a bathroom cabinet, closet, home or work office, automobile, or elsewhere. In such situations, a person who is sexually assaulted then has near-immediate access to the sexual assault aid kit if needed. Alternatively, it is within the scope of the invention that a sexual assault aid kit may be obtained after an assault, such as, for example only, in a drugstore or other retail outlet, from a crisis center, or online. In another embodiment, a person would keep a second sexual assault aid kit in their travel bag, so that the kit is available even when a person is traveling.

FIG. 1 shows a block diagram of one illustrative embodiment of the sexual assault aid kit 100. One or more materials, labeled 110, 120, 130, 140, and 150, may be included in the sexual assault aid kid 100.

Victim disclosure form 110 is one intended component of the sexual assault aid kit 100. In one embodiment, victim disclosure form 110 provides instructions for recording the details of the assault. The instructions include but are not limited to instructing the victim to: (1) record who the assailant was or, if not known, details concerning the physical appearance of the assailant(s); (2) record what the assailant may have said before, during, and after the assault and whether the assailant spoke with an accent or in a foreign language; (3) record the details of the assault including when the assault occurred, where it occurred, whether the assailant had a weapon and if so what it was; (4) record whether it is possible there were eyewitnesses and if so, who; (5) document any injuries, no matter how small, including by taking photos if possible; (6) seek medical care, even if there are no visible injuries; and (7) consider filing a police report.

FIG. 2 depicts an exemplary victim disclosure form 110 in one embodiment of the invention. FIG. 2 is illustrative, not limiting, and a person of ordinary skill in the art will recognize that the invention disclosure form 110 may take different forms and/or ask for information in different formats.

As shown in FIG. 2, the victim disclosure form 110 may in one embodiment contain introductory information, including whether the information the victim will provide should be treated as restricted or unrestricted. That is, the victim disclosure form 110 may explain to the victim the purpose of the form, including if the collected information is be used to document the elements of a sexual assault with the intent of reporting to law enforcement for the purpose of seeking legal remedy against the assailant. This is known as "unrestricted reporting" and is conducted when seeking the prosecution and conviction of the assailant in the legal system. The victim disclosure form 110 may also be used to collect initial information regarding one or multiple incidents involving the same alleged assailant. This may be termed "restricted" reporting. The victim in completing victim disclosure form 110 may be asked (such as with a checkbox or other indicator), at the outset, whether they are reporting "unrestricted" or "restricted" information.

The victim disclosure form 110 may for example also explain to the victim in the introductory section that: there is no wrong or right answer to any of the questions; they should answer all questions when confident of the answers, but otherwise leave the response blank or respond with N/A if the inquiry does not apply to reported assault.

Next, the victim disclosure form 110 may collect basic information regarding the victim, including name (as well as nicknames, if applicable), address, age, sex, race, and whether the victim has a disability and if so, what it is.

The victim disclosure form 110 may also prompt for information concerning the incident. This may include the date and time of when the incident/injury to the victim occurred; the name(s) of the assailant(s), if known; and any relationship the victim may have with the assailant. For example, the victim disclosure form 110 may prompt the victim to state whether the assailant is any one or more of the following: acquaintance; colleague; significant other; spouse; religious leader; boss or supervisor; co-worker; teacher; therapist; coach; teammate; classmate; other (explain); or unknown. The victim disclosure form 110 may ask for additional information concerning the victim's relationship (if any) to the assailant, such as without limitation the circumstances under which the relationship started and its status. As shown in FIG. 2, the victim disclosure form 110 may ask the victim to explain whether the assailant, or someone acting on their behalf, threatened the victim, such as to "stay quiet" or not report the incident. The victim disclosure form 110 may also ask the victim whether they believe they are in any danger. If the answer to one or more of these questions is "yes," the victim disclosure form 110 may recommend or otherwise instruct the victim to immediately contact law enforcement.

The victim disclosure form 110 may ask the victim to provide identifying information concerning the assailant, including details concerning the assailant's physical appearance and any visible markings. This may include, but is not limited to, the assailant's gender; race and/or skin color; hair and eye color; the type of hair style; the existence of facial hair; any tattoos, and what they looked like; any visible injuries such as cuts, scratches, or wounds; any other physical markings such as scars, acne, or birthmarks; the approximate height and weight or body shape; any jewelry and/or body piercings; and any details concerning clothes and footwear.

Next, the victim disclosure form 110 may ask for details concerning the location of the assault. This may prompt the victim for information regarding whether the incident took place indoors (e.g., a door room, hotel room, office, or other location), in a vehicle (if so, any details the victim may remember concerning the vehicle such as make/model and color), or outdoors (if so, where and prompt for details such as landmarks, nearby buildings, foliage, or other related information).

The victim disclosure form 110 may also ask the victim whether there were any witnesses to the assault. This is to prompt the victim to provide any information concerning whether anyone may have first-hand knowledge of the assault, such as a friend, staff member, classmate, relative, teacher, coach, colleague, etc. who was present either before, during, or after the assault.

The victim disclosure form 110 may also prompt the victim to provide as much detailed information as possible concerning the assault. This is effectively an attempt to obtain a chronology of what happened. Collecting as many details as possible will be helpful in bolstering the victim's credibility if the assault is reported and the assailant is prosecuted. The details provided by the victim may, for example, be corroborated by witnesses, video surveillance footage, other electronic evidence, or physical evidence collected from the victim and/or assailant. As explained above, the information sought may include: details concerning the physical appearance of the assailant(s); what the assailant may have said before, during, and after the assault and whether the assailant spoke with an accent or in a foreign language; when the assault occurred, where it occurred, whether the assailant had a weapon and if so what it was; whether there were one or more witnesses and if so, who; and whether the victim suffered any injuries, including what they were.

The victim disclosure form 110 may also prompt the victim to explain their current emotional state, including but not limited to whether the victim is experiencing anger, fear, sadness, shame, guilt, etc. The victim may also be asked whether they are having or had suicidal thoughts or ideation. The victim's responses may be considered with, if possible, trauma informed care being administered throughout this reporting process to avoid additional or repeated traumatization.

The victim disclosure form 110 may also prompt for the victim's current physical state. This may include any signs or symptoms experienced by the victim since the assault, such as fever, chills, aches, lesions, bruises, headaches, etc. Sexually transmitted disease symptoms may also be included, such as discharge, oozing, itching, pain, pus, sores, lesions, odor, etc.

The victim disclosure form 110 may also ask the victim to describe any current fears or concerns they are experiencing regarding the assault. This may include concerns regarding sexually transmitted disease, pregnancy, ongoing domestic violence, physical and/or mental health, etc. Other fears/concerns the victim may experience may relate to, if applicable, workplace retaliation for reporting the assault, and rumors or gossip at the workplace, school, church, etc.

The victim disclosure form 110 may also ask the victim to describe their current living situation, for evaluating, for example, whether a temporary restraining order may be warranted (e.g., ongoing domestic violence or assault, or other instability in the victim's living conditions). The victim disclosure form 110 may also ask whether the victim is likely to interact with the assailant again, such as in the workplace, at school, as part of a sports team or other recreational group, at a volunteer organization, as part of a church group, or so on.

While not shown in FIG. 2, it is contemplated in one embodiment of the invention that the invention disclosure form 110 may delve further into the incident and seek additional information. Provided next is a series of questions that may be appropriate to ask the victim as part of the invention disclosure form 110 or otherwise. (1) Were you a willing participant? (2) Were you coerced (for example, did the assailant urge the victim to take a pill or drink a substance)? (3) Did you feel forced? (4) Were you intimidated? (5) Is there a power imbalance (for example, is the assailant in a position of authority such as a boss, teacher, coach, clergy, etc.)? (6) Did you engage in conversation(s) of a sexual nature with the accused prior to the assault or after? (7) Do you have text messages, emails, or other electronic communications with the assailant (e.g., probing for possible predatory behavior)? (8) Were you incapacitated by drugs or alcohol (what type and how many)? (9) If so, did you self-administer or do you believe they were administered without your knowledge and consent? (10) Were you able to resist? (11) Were you able to do any of the following (kick, grab, twist, slap, punch, pinch, bite, etc.)? (12) Were you able to say no? (13) Were you able to push the assailant away? (14) Did you try (if no, why not)? (15) Did you see the assailant again? (16) Under what circumstances? (17) Do you have previous sexual assaults, as either a child or adult, to report in addition to this one? (18) Did you ask to leave or be taken home? (19) Was anyone waiting for you when you arrived at your home? (20) Have you expressed concerns about the accused's behavior to anyone?

As made clear from the above, it is contemplated that the victim disclosure form 110 will be as detailed as possible in terms of asking the victim to document the assault, including the non-limiting prompts for information identified above.

The methods of recording information in response to information requested on the victim disclosure form 110 include but are not limited to: (1) storing an audio and/or video recording of the victim's responses to the instructions on the victim disclosure form 110 (using for example a smartphone, computer, or other recording device); (2) typing responses into a document stored on a computer, smartphone, or other device; (3) writing the responses on paper; or (4) writing the responses in spaces provided on the victim disclosure form 110. It is also contemplated and within the scope of the invention that the victim may ask a friend, family member, or confidant to record the victim's responses.

Returning to FIG. 1, evidence collection bag 120 includes instructions and provides a way to collect evidence related to the assault. It is contemplated that the evidence intended for collection includes the victim's clothing or any other items that the assailant may touched. This includes clothing or other items that may contain the assailant's saliva, fingerprints, blood, or semen.

It is important to note that if the victim scratched the assailant, the victim should be informed that they may choose not to wash their hands and consider reporting the incident to the police so that the police may take evidence from the victim's fingernails, which may include the assailant's DNA. Similarly, if the assailant penetrated the victim or there was genital contact, the victim should be informed that they may choose to seek immediate medical attention so that a forensic medical examination may occur and a sexual assault evidence kit (known as a "rape kit") may be used to collect evidence that may help identify the assailant and/or be used in a future prosecution of the assailant.

With respect to the evidence collection bag 120, there are many evidence collection kits available on the market (including a variety of kits from Arrowhead Forensics, Tri Tech Forensics, Sirchie, and others). These kits are generally for use by law enforcement and medical personnel. Such kits are nonetheless contemplated as meeting the requirements of evidence collection bag 120 and thus are considered included in one embodiment of the invention.

In another embodiment of the invention, evidence collection bag 120 is a plastic sealable bag that includes a way for the victim to record details concerning the evidence. The bag should have a strong seal (to avoid a risk of tampering) and should be large enough so that evidence such as jeans or pants, sweaters, or coats, and/or undergarments, may be placed in the evidence collection bag 120. On the bag itself, or separately accompanying the bag, may be a form that the victim fills out regarding the contents of the evidence collection bag 120. The form may include, but is not limited to, spaces to record the victim's name, the date and time of evidence collection, the current location, the item(s) in the bag, and who sealed the bag. Suitable evidence collection bags 120 in this embodiment are available from BankSupplies, Inc., Sirchie, Secur-Pak, and others. The evidence collection bag 120 may be clear, semi-clear, or opaque.

It should also be noted that plastic evidence collection bags may have certain drawbacks, particularly if the evidence to be collected is wet or moist. If wet or moist items are placed in plastic, mold may grow which could degrade or destroy the evidence. Therefore, the evidence collection bag 120 may also be made of heavy-duty paper and include a form for the victim to fill out either printed on the bag or separately for placement in the bag. Paper bags are best for wet or moist items as the items may dry when placed in paper bags. Ideally, the items will be allowed to dry before placing in an evidence collection bag 120. But if that is not possible, items such as clothing should not be folded when wet or moist, as they may not sufficiently dry in such situations and mold could develop as discussed above.

Another potential drawback with using plastic bags as evidence collection bag 120 is that some plastic bags may release chemicals that could react with the evidence in the bag. This possibility is much lower with paper bags, which are generally inert. For these reasons, it is preferred that evidence collection bag 120 be made of paper material, but the use of plastic bags as described above is still considered within the scope of the invention, and the foregoing analysis does not constitute a teaching away from, or discouragement of, using plastic bags as evidence collection bag 120. Instead, a person skilled in the art of evidence collection will know when it is appropriate to use paper or plastic.

It is within the scope of the invention that the evidence collection bag 120 may include one or more bags so that each item may be placed in a separate bag. It is also within the scope of the invention that the evidence collection bag 120 includes both plastic and paper bags.

The post-exposure prophylaxis (PEP) card 130 is a card or other insert that informs a victim of the risks of HIV exposure from sexual assault and provides information concerning accessing medicine that is available to prevent HIV after possible exposure. PEP involves the use of anti-retroviral drugs to stop HIV seroconversion from taking place after a high-risk incident such as sexual assault. It is important to inform the victim on the PEP card 130 that PEP must be started within 72 hours after possible exposure to HIV. Currently, PEP is available by prescription, and a PEP cycle takes 28 days to complete. See https://hivinfo.nih.gov/understanding-hiv/fact-sheets/post-exposure-prophylaxis-pep.

In addition to information concerning PEP, the PEP card 130 may optionally include website links that offer online prescription services for PEP. PlushCare (www.plushcare.com) is one such available service. PEP is available through a person's insurance, but free or low-cost options are available, including for victims of sexual assault. PEP is also available from hospital emergency rooms, some health clinics, and Planned Parenthood health centers. See https://www.plannedparenthood.org/learn/stds-hiv-safer-sex/hiv-aids/pep.

Like the PEP card 130, the morning after card 140 is a card or insert that provides the victim with information concerning the availability of emergency contraception in the event the victim is concerned that there is the risk of pregnancy following the assault. Although it varies from state to state in the U.S., forms of emergency contraception are available without a prescription and may be found in drugstores, through Planned Parenthood, or other clinics. While known as the "morning after" pill, emergency contraception may work when taken within five days of unprotected sex. https://www.womenshealth.gov/a-z-topics/emergency-contraception.

There are currently two types of FDA-approved emergency contraceptive pills: Ella® (ulipristal acetate); and Plan B One-Step®, which also has several generic versions. The former is only available by prescription, but the latter (and generics) are available without a prescription and are sold in drugstores. A pharmacist can help locate the versions available without a prescription. In one embodiment of the invention, the sexual assault aid kit includes over-the-counter emergency contraceptives.

It is contemplated and within the scope of the invention that the PEP card 130 and morning after card 140 will include website links, including without limitation the ones identified herein, and/or other sources of information to provide a victim with full informed information concerning the availability of these drugs, their risks, and potential side-effects.

Further, it should be noted that the PEP card 130 and morning after card 140 are not actual prescriptions, but rather provide the necessary information for a victim to obtain information that may facilitate obtaining an actual prescription.

The crisis resource guide 150 is intended to provide a victim with a list of resources that may help or otherwise be useful to a victim. A person of ordinary skill will appreciate that there are many such resources available, including without limitation the telephone numbers and websites identified herein, as well as many others. For example, support services and resources may also be available from the victim's church, school, or workplace. In addition to the websites and telephone numbers identified herein, others include the National Domestic Violence Hotline (800-799-7233), and the National Suicide Hotline (988). Local and state police phone numbers may also be provided, as may self-care tips. All such resources are considered within the scope of the information that may be included on the crisis resource guide 150.

It is also within the scope of the invention to instruct the victim concerning the option of getting a urinalysis test following the assault. This is particularly relevant if the victim believes that the assailant (or someone in concert with assailant) provided unwanted drugs to the victim, such as placing a drug in the victim's food or drink. As non-limiting examples, the victim disclosure form 110 may include a question concerning whether the victim believes they were drugged, and if the response is affirmative then the victim disclosure form 110 may include an instruction or recommendation that that the victim take a urine test. Additionally, or alternatively, the crisis resource guide 150 may include information concerning victims being unknowingly exposed to a drug and provide instructions for obtaining a urine test. It is also within the scope of the invention that the kit 100 include a separate card or insert (not shown in FIG. 1) that provides details concerning a victim's unknowing drug ingestion and includes instructions or information for obtaining a urine test.

It should be noted that urine tests are widely available at local health clinics or laboratories. Further, there are FDA-approved over-the-counter drug tests available that are intended for in-home use and provide fast results on the presence of a variety of drugs in a person's urine. Large pharmacy chains in the U.S., such as CVS and Walgreens, offer such products for sale. It is within the scope of the invention that the sexual assault aid kit 100 may in one embodiment include a urine test along with instructions for using it.

If a victim takes a urine test (either at home, at a clinic, doctor's office, drug-testing facility, or other location), the victim should be instructed to preserve the results for later use as potential evidence against the assailant.

Although not shown as part of FIG. 1, it is within the scope of the invention that the sexual assault aid kit 100 may also include an introduction guide or insert that informs the user of the contents of the kit 100 and provides instructions concerning how to use the materials within the kit 100. For example, the introduction guide may inform a victim that if the sexual assault took place over, e.g., 24 or 48 hours ago, the PEP card 130 and morning after card 140 should be consulted first. Other variations concerning the order of the materials considered are contemplated and within the scope of the invention.

While shown as separate components in FIG. 1, it is understood and within the scope of the invention that one or more of the victim disclosure form 110, evidence collection bag 120, PEP card 130, morning after card 140, crisis resource guide 150, and/or instruction guide may be combined. As one non-limiting example, the information contained in the PEP card 130 and morning after card 140 could be combined into one card or other disclosure form. As another non-limiting example, the instruction guide may be combined with the crisis resource guide 150. Other such combinations are within the skill of a person of ordinary skill in the art and are considered within the scope of the invention.

It is contemplated that access to the sexual assault aid kit 100 may be provided in various ways. For example, the kit 100 may be sold in drugstores or other retail outlets. It may be made available through online shopping sites such as Amazon.com and others. It may be available from health clinics, Planned Parenthood, or doctor offices. It is also contemplated that colleges and universities may make the kit 100 available to students. It is also contemplated that insurance companies and law enforcement agencies may make the kit 100 available. Other sources of availability are contemplated and considered within the scope of the invention.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

The invention claimed is:

1. A sexual assault aid kit comprising:
- a victim disclosure form with instructions to record details of a sexual assault;
- an evidence collection storage receptacle;
- a means communicating post-exposure prophylaxis (PEP) prescription information; and
- a means communicating morning after contraceptive information.

2. The sexual assault aid kit of claim 1 further comprising a means providing crisis resource information.

3. The sexual assault aid kit of claim 2 wherein the crisis resource information comprises information regarding sexual assault assistance websites or telephone numbers.

4. The sexual assault aid kit of claim 1, wherein the evidence collection storage receptacle comprises instructions for storing potential evidence related to a sexual assault.

5. The sexual assault aid kit of claim 4 wherein the evidence collection storage receptacle comprises means for recording information regarding the potential evidence.

6. The sexual assault aid kit of claim 1 wherein the means communicating post-exposure prophylaxis (PEP) prescription information comprises information concerning HIV infection prevention.

7. The sexual assault aid kit of claim 1 wherein the means communicating morning after contraceptive information comprises information concerning morning after alternatives.

8. The sexual assault aid kit of claim 1 further comprising an instruction guide for using the contents thereof.

* * * * *